United States Patent
Qui (10) Patent No.: US 10,851,899 B2
(45) Date of Patent: Dec. 1, 2020

(54) REVERSING VALVE AND HOUSEHOLD WATER PURIFIER INCLUDING SAME TECHNICAL FIELD

(71) Applicant: 3M INNOVATIVE PROPERTIES COMPANY, St. Paul, MN (US)

(72) Inventor: Biyong Qui, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 15 days.

(21) Appl. No.: 16/344,053

(22) PCT Filed: Oct. 23, 2017

(86) PCT No.: PCT/US2017/057805
§ 371 (c)(1),
(2) Date: Apr. 23, 2019

(87) PCT Pub. No.: WO2018/080960
PCT Pub. Date: May 3, 2018

(65) Prior Publication Data
US 2019/0257435 A1  Aug. 22, 2019

(30) Foreign Application Priority Data
Oct. 26, 2016  (CN) .......................... 2016 1 0950245

(51) Int. Cl.
*F16K 11/07* (2006.01)
*B01D 61/02* (2006.01)
(Continued)

(52) U.S. Cl.
CPC ............ *F16K 11/07* (2013.01); *B01D 61/025* (2013.01); *B01D 61/08* (2013.01); *B01D 61/10* (2013.01);
(Continued)

(58) Field of Classification Search
CPC ............ B01D 2313/18; B01D 2313/50; B01D 61/025; B01D 61/08; B01D 61/10;
(Continued)

(56) References Cited

U.S. PATENT DOCUMENTS 3,561,489 A   2/1971  Furrer
3,625,246 A  12/1971  Reaves
(Continued)

FOREIGN PATENT DOCUMENTS

CN   101435518    12/2010
CN   102678971     9/2012
(Continued)

OTHER PUBLICATIONS

International Search Report for PCT International Application No. PCT/US2017/057805, dated Jan. 31, 2018, 3 pages.

*Primary Examiner* — Terry K Cecil
(74) *Attorney, Agent, or Firm* — Scott A. Baum (57) ABSTRACT

Disclosed is a reversing valve. The reversing valve controls the position change of a valve element thereof under the joint action of the total changing pressure from a piston side thereof and a compression spring side thereof to make connection and disconnection between different chambers in the reversing valve, so that the reversing valve can control connection and disconnection of relevant waterways. The reversing valve adopts a purely mechanical design and has characteristics of high reliability and fast switching. Also disclosed is a household water purifier including the reversing valve.

20 Claims, 9 Drawing Sheets (51) Int. Cl.
  *B01D 61/08* (2006.01)
  *B01D 61/10* (2006.01)
  *B01D 61/12* (2006.01)
  *C02F 1/44* (2006.01)
  *F16K 31/126* (2006.01)
  *C02F 9/00* (2006.01)
  *F16K 3/314* (2006.01)

(52) U.S. Cl.
  CPC .............. *B01D 61/12* (2013.01); *C02F 1/441* (2013.01); *C02F 9/005* (2013.01); *F16K 3/314* (2013.01); *F16K 11/0712* (2013.01); *F16K 31/1262* (2013.01); *B01D 2313/18* (2013.01); *B01D 2313/50* (2013.01); *C02F 2201/004* (2013.01); *C02F 2201/005* (2013.01); *C02F 2209/40* (2013.01)

(58) Field of Classification Search
  CPC .... B01D 61/12; C02F 1/441; C02F 2201/004; C02F 2201/005; C02F 2209/40; C02F 9/005; F16K 11/07; F16K 11/0716; F16K 31/1262; F16K 3/314; F16K 11/0712
  See application file for complete search history.

(56) References Cited

U.S. PATENT DOCUMENTS

| | | | |
|---|---|---|---|
| 3,887,463 A * | 6/1975 | Bray | F16K 31/122 |
| | | | 210/110 |
| 4,190,537 A | 2/1980 | Tondreau | |
| 4,678,565 A | 7/1987 | Norton | |
| 5,193,988 A | 3/1993 | Solomon | |
| 5,979,502 A | 11/1999 | Scott | |
| 5,992,449 A | 11/1999 | Sprague | |
| 6,764,595 B1 * | 7/2004 | Halemba | B01D 61/08 |
| | | | 137/590 |
| 9,873,087 B2 * | 1/2018 | Bassett | B01D 61/06 |
| 2005/0098755 A1 | 5/2005 | Kussel | |
| 2009/0178713 A1 | 7/2009 | Tondolo | |
| 2014/0131281 A1 | 5/2014 | Morikawa | |
| 2014/0326665 A1 | 11/2014 | Feldstein | |
| 2016/0169402 A1 | 6/2016 | Hilzendegen | |

FOREIGN PATENT DOCUMENTS

| | | |
|---|---|---|
| WO | WO 2001-068227 | 9/2001 |
| WO | WO 2014-058724 | 7/2014 |

* cited by examiner

Fig. 10

REVERSING VALVE AND HOUSEHOLD WATER PURIFIER INCLUDING SAME TECHNICAL FIELD

CROSS REFERENCE TO RELATED APPLICATIONS

This application is a national stage filing under 35 U.S.C. 371 of PCT/US2017/057805, filed Oct. 23, 2017 which claims the benefit of Chinese Patent Application No. 201610950245.X, filed Oct. 26, 2016, the disclosures of which are incorporated by reference in their entirety herein.

The present invention relates to the field of liquid purification technologies, and in particular, to a reversing valve and a household water purifier including the valve.

BACKGROUND

Due to the risk of secondary pollution during transportation in municipal water supply, household water purifier devices gradually enter the life of ordinary people. Existing water purifiers mainly consist of various filtering media having different properties and cylinders. The filtering media are used for removing various impurities or contaminants in tap water, and the cylinder parts are used for accommodating the filtering media and connecting the filtering media to municipal water supply pipelines.

Because of the difference in water conditions, municipal water supply varies from area to area in water quality; for example, the average water hardness in the northern area is higher than that in the mid-eastern area, and the average water hardness in the mid-eastern area is higher than that in the southern area. Generally speaking, the phenomenon of incrustation after heating of drinking water is common in areas having high water hardness. In order to solve the problem of incrustation, most of water purifier manufacturers use a reverse osmosis membrane filtration technology to manufacture reverse osmosis water purification machines.

A small reverse osmosis water purification machine cannot meet a user's water demand if used directly because of a small pure water flow (50 gallons/day to 200 gallons/day) of a membrane element; and thus a water storage tank is used to store pure water, and pure water is discharged from the water storage tank when the user turns on a tap. The water storage tank is provided with two cavities separated by an elastic diaphragm with one cavity used for storing pure water and the other cavity storing compressed air; the compressed air has a certain pressure, and pure water can be forced out of the tap when the user turns on the tap.

When no pure water exists in the water storage tank, the compressed air has the largest volume and the lowest pressure; when the amount of pure water in the water storage tank increases, the volume of the compressed air gradually decreases and the pressure thereof increases, and the back pressure of the reverse osmosis membrane element increases accordingly. Because the pressure of tap water varies from place to place, and a certain pressure difference (the pressure difference is equal to the forward pressure of the reverse osmosis membrane minus the back pressure of the water storage tank) is required for maintaining normal operation of the reverse osmosis membrane, each water purifier manufacturer installs a booster pump in a water purification machine to overcome the back pressure of the water storage tank. The booster pump requires associated electrical parts such as a power source, an electromagnetic valve, and a pressure switch; as a result, product costs are increased, and the faulty rate is also increased.

Besides, when the water storage tank is full of water, the compressed air has the smallest volume and the largest pressure, and the largest water flow is output at the instant the user turns on the tap; however, as the pure water in the water storage tank decreases, the compressed air expands in volume, the pressure becomes smaller, and an increasingly smaller water flow is output from the tap; the user will then have a poor experience in the continuous use of water, and the waiting time of the user is also increased.

In order to solve the problem of the water storage tank, some manufacturers choose to increase the size (more than 400 gallons/day) of the reverse osmosis membrane element and eliminate the water storage tank, so that the flow obtained when the user turns on the tap is directly the seepage flow of the reverse osmosis membrane. However, the costs of the large-size membrane element are high, and an associated booster pump of higher power is required, which leads to serious noise and vibration problems, increasing users' cost and negatively affecting users' experiences. Moreover, after the reverse osmosis pure water machine stands still for a period of time, the filtration efficiency in the initial operation of the membrane becomes low, and the content of total dissolved solids (TDS) in water discharged by the user from the tap becomes high, resulting in a poor taste. Furthermore, due to the great influence of water temperature on the seepage flow of the reverse osmosis membrane, the pure water machine without a water storage tank has a smaller water flow output from the tap when the temperature is low in winters or in spring and autumn, thereby affecting user experience.

In order to solve the aforementioned problem, the patent WO200168227A1 discloses a reverse osmosis pure water machine without a pump, wherein the pure water machine needs to use a water storage tank, but there is no pressure in the water storage tank. By using a mechanical reversing valve, when the user needs to use water, the reversing valve operates to introduce the pressure of tap water into the water storage tank to force pure water out of the tap; when the user turns off the tap, the reversing valve operates again to release the pressure of the water storage tank into a drainage pipeline. Because there is no pressure in the water storage tank, a booster pump is not required, pure water can be produced by directly using the pressure of tap water, and is replenished into the water storage tank; when the water storage tank is filled up, pure water cannot enter the water storage tank any morel the pressure of the water storage tank begins to rise and pushes the mechanical reversing valve to continue operating until the connection between the pure water machine and tap water is closed. Although the solution solves the problem of the pressure of pure water in the case that a water storage tank is provided, and it does not require a booster pump, the reversing valve in the solution integrates complex functions and has excessive internal friction, and thus has lowered its reliability, and it cannot work normally in the case of low municipal water supply pressure.

In view of the above, the existing reverse osmosis pure water machines having pressure water storage tanks or having no tank have defects in design; and the aforementioned problem can be resolved by a novel reversing valve in the present invention.

SUMMARY

One objective of the present invention is to provide a reversing valve, comprising: a valve body, having a cylindrical or approximately cylindrical valve element disposed therein, wherein the valve element has a first end surface and a second end surface opposite to the first end surface; a piston seat, disposed on the first end surface side of the valve element and having at least a portion in contact with the valve body, wherein a piston is disposed in the piston seat; a diaphragm end cover, disposed on one side of the piston seat opposite to the valve body; a piston diaphragm, fixed to the diaphragm end cover and disposed between the diaphragm end cover and the piston seat, and disposed between the piston and the piston seat, so that the piston has no direct contact with the piston seat; and a spring housing, disposed on the second end surface side of the valve element and having at least a part in contact with the valve body, wherein a compression spring is disposed in the spring housing and the compression spring is disposed to be in contact with the second end surface of the valve element, wherein centers of the piston diaphragm, the piston, the valve element, and the compression spring are on the same axis.

Another objective of the present invention is to provide a household water purifier, comprising: a reverse osmosis membrane filter element, including a water inlet, a pure water outlet, and a non-pure water outlet, wherein the water inlet is used for receiving water to be treated; a first one-way valve, having a water inlet communicating with the pure water outlet of the reverse osmosis membrane filter element through a waterway; a second one-way valve, having a water inlet communicating with a water outlet of the first one-way valve through a waterway and having a water outlet communicating with a water inlet of a tap through a waterway; a water storage tank, including a first cavity and a second cavity isolated by a waterproof film, wherein total capacities of the two cavities are fixed, and the capacity of the first cavity decreases as the capacity of the second cavity increases or the capacity of the first cavity increases as the capacity of the second cavity decreases; the first cavity is used for accommodating pure water from the pure water outlet of the reverse osmosis membrane filter element and communicates with the water outlet of the first one-way valve and the water inlet of the second one-way valve through a waterway, and the second cavity is used for accommodating non-pure water from the non-pure water outlet of the reverse osmosis membrane filter element; a switching device, used for connecting or disconnecting a waterway to the water inlet of the reverse osmosis membrane filter element according to a change in pressure of the first cavity of the water storage tank; and the reversing valve, wherein the first channel of the reversing valve communicates with the water inlet of the tap through a waterway, the fourth channel of the reversing valve communicates with the non-pure water outlet of the reverse osmosis membrane filter element through a waterway, the second channel of the reversing valve communicates with a drainage path through a waterway, the third channel of the reversing valve communicates with the second cavity of the water storage tank through a waterway, the reversing valve is used for connecting the fourth channel to the third channel and meanwhile disconnecting the second channel from the third channel according to a change in water pressure acting on the piston through the first channel, or disconnecting the fourth channel from the third channel and meanwhile connecting the second channel to the third channel according to a change in water pressure acting on the piston through the first channel.

The reversing valve according to the present invention is applicable to a filtering apparatus, and particularly to a water purification system, especially a household water purifier.

BRIEF DESCRIPTION OF THE DRAWINGS

FIG. 6 is a schematic view illustrating a state of the reversing valve 500 according to the embodiment of the present invention when a tap 600 is turned on;

DETAILED DESCRIPTION OF THE EMBODIMENTS

In order to make those skilled in the art to better understand the technical solution of the present invention, the present invention is further described in detail below with reference to the accompanying drawings and specific embodiments.

Figure 1:
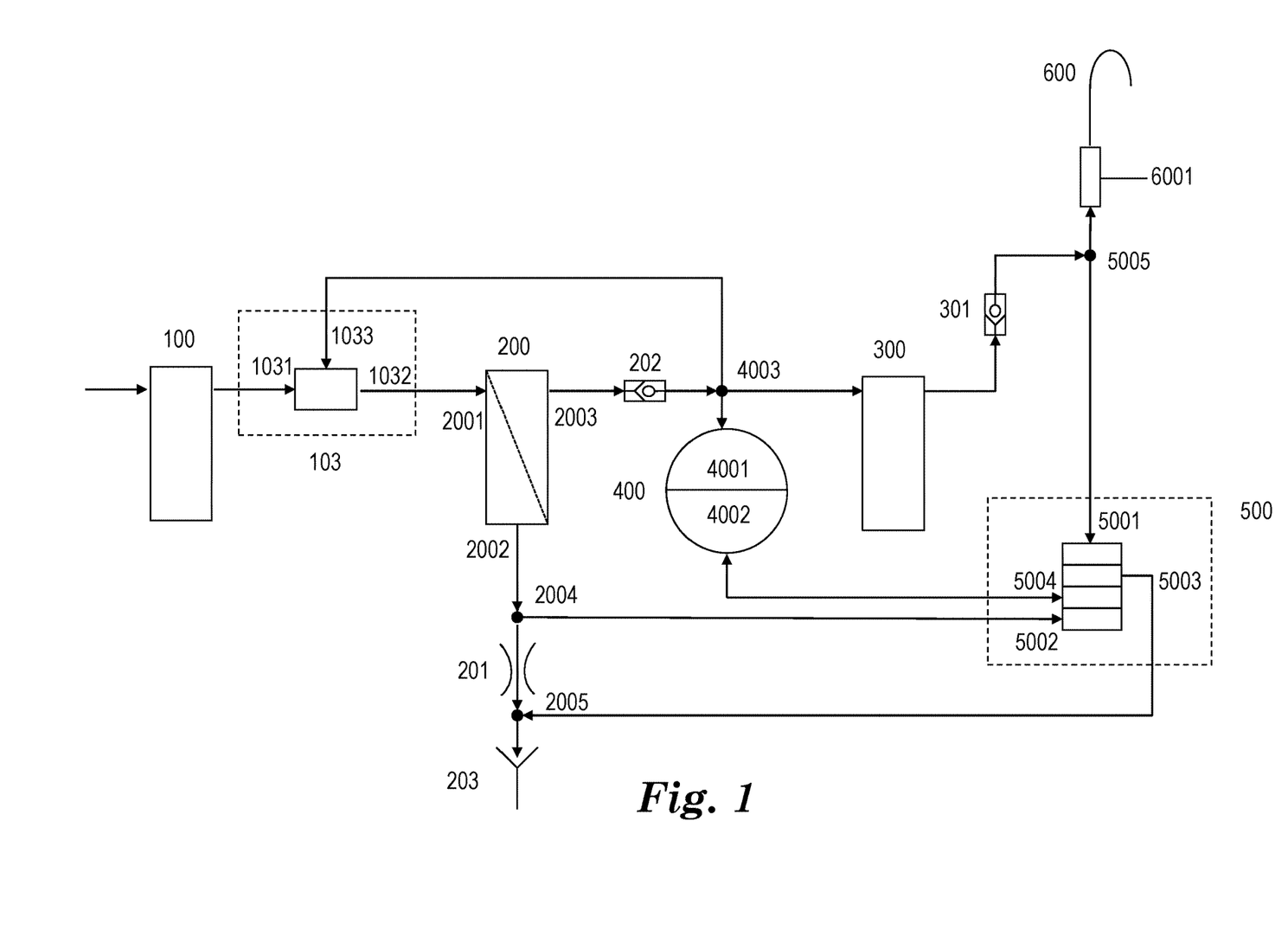
FIG. 1 is a schematic overall view of a water purifier having a reversing valve according to an embodiment of the present invention.

FIG. 1 is a schematic overall view of a water purifier having a reversing valve according to an embodiment of the present invention. As shown in FIG. 1, the household water purifier according to the embodiment of the present invention consists of a pre-filter 100 (optional), an automatic stop valve 103, a reverse osmosis membrane filter element 200, a throttling device 201 (optional), one-way valves 202 and 301, a post-filter element 300 (optional), a water storage tank 400, and a reversing valve 500.

The pre-filter 100 is optional in the household water purifier according to the present invention and is provided with a water inlet and a water outlet; tap water is connected to the water inlet of the pre-filter 100, and the water outlet of the pre-filter 100 is connected to a water inlet 1031 of the automatic stop valve 103.

The automatic stop valve 103 is connected to three waterways: the water inlet of the automatic stop valve 103 is 1031 and is connected to the water outlet of the pre-filter 100; a water outlet of the automatic stop valve 103 is 1032 and is connected to a water inlet of a lower-level filter element; and a switching waterway of the automatic stop valve 103 is 1033 and is connected to a pure water storage cavity 4001 of the water storage tank 400.

The reverse osmosis membrane filter element 200 is connected to three waterways: a water inlet 2001 of the reverse osmosis membrane filter element 200 is connected to the water outlet 1032 of the automatic stop valve 103; a concentrated water port (namely, a non-pure water outlet) 2002 of the reverse osmosis membrane filter element 200 is connected to a water inlet of the throttling device 201; and a pure water outlet 2003 of the reverse osmosis membrane filter element 200 is connected to a water inlet of the one-way valve 202. Those skilled in the art know that although the concentrated water port 2002 of the reverse osmosis membrane filter element 200 is connected to the water inlet of the throttling device 201 in FIG. 1, the present invention is not limited thereto. In practice, the throttling device 201 itself is optional.

As shown in FIG. 1, the throttling device 201 is provided with a water inlet and a water outlet; and specifically, the water inlet is connected to the concentrated water outlet (namely, the non-pure water outlet) 2002 of the reverse osmosis membrane 200, and the water outlet is connected to a water inlet of a drainage component 203.

The water storage tank 400 is provided with two cavities 4001 and 4002 having variable capacities, the cavity 4001 is connected to a water outlet of the one-way valve 202 and is used for accommodating pure water from the pure water outlet of the reverse osmosis membrane filter element 200, and the cavity 4002 is connected to a channel 5004 of the reversing valve 500 and is used for accommodating non-pure water from the concentrated water outlet 2002 of the reverse osmosis membrane filter element 200.

A connection point 4003 is used for connecting the switching waterway 1033 of the automatic stop valve 103, the pure water cavity 4001 of the water storage tank 400, the water outlet of the one-way valve 202, and a water inlet of the post-filter element 300 (optional).

In the case that the post-filter element 300 is provided, the post-filter element 300 is provided with a water inlet and a water outlet, the water inlet of the post-filter element 300 is connected to the connection point 4003, the water outlet of the post-filter element 300 is connected to the water inlet of the one-way valve 301, and the water outlet of the one-way valve 301 is connected to 5005 near a water inlet of a tap 600.

The reversing valve 500 is connected to four waterways. Specifically, as shown in FIG. 1, the channel 5004 of the reversing valve 500 is connected to the cavity 4002 of the water storage tank and is used for controlling pressure switching of the cavity 4002; a channel 5002 of the reversing valve 500 is connected to the concentrated water outlet (namely, the non-pure water outlet) 2002 of the reverse osmosis membrane filter element 200, and a connection point 2004 thereof is located between the non-pure water outlet 2002 and the water inlet of the throttling device (for example, a throttling valve) 201; a channel 5003 of the reversing valve 500 is connected to the water outlet of the throttling device 201, and a connection point 2005 thereof is located between the water outlet of the throttling device 201 and the water inlet of the drainage component 203; a channel 5001 of the reversing valve 500 is connected to the water inlet 6001 of the tap 600, and a connection point 5005 thereof is located between the water inlet 6001 and the water outlet of the post-filter element 300.

Figure 2:
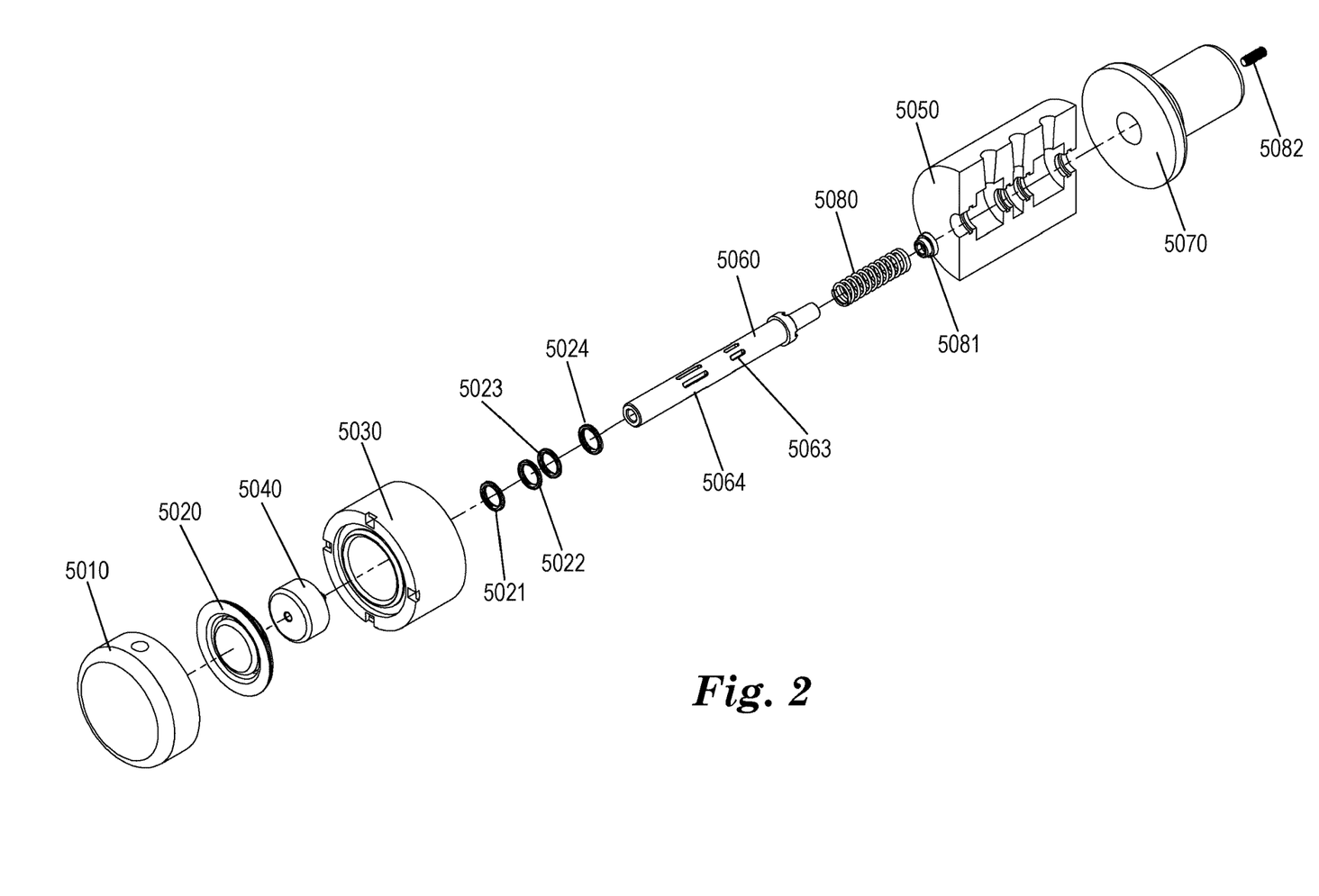
FIG. 2 is an exploded view of a reversing valve 500 according to the embodiment of the present invention.
Figure 3:
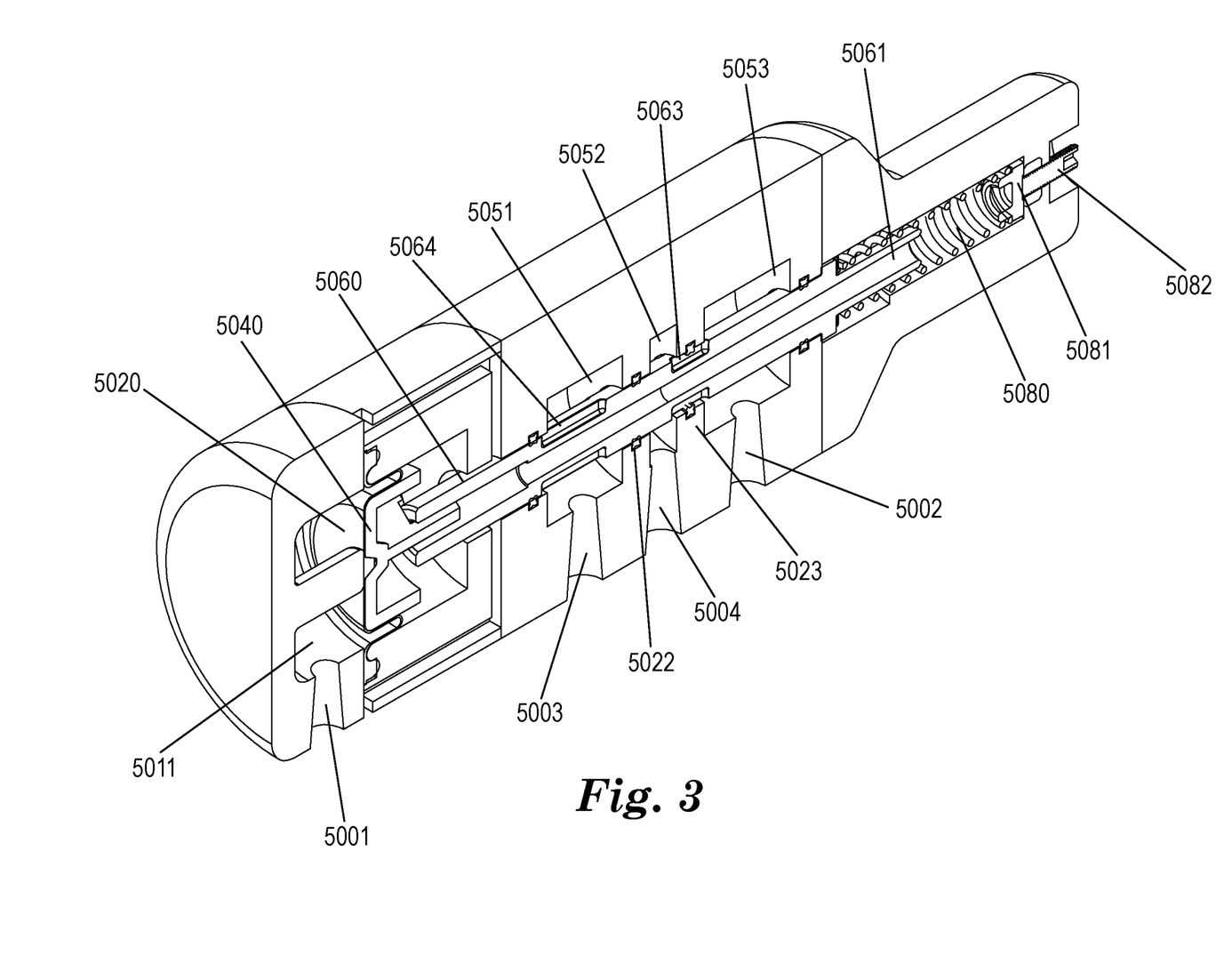
FIG. 3 is a schematic view of a portion obtained after half of the reversing valve according to the embodiment of the present invention is removed along an axis thereof.
Figure 4:
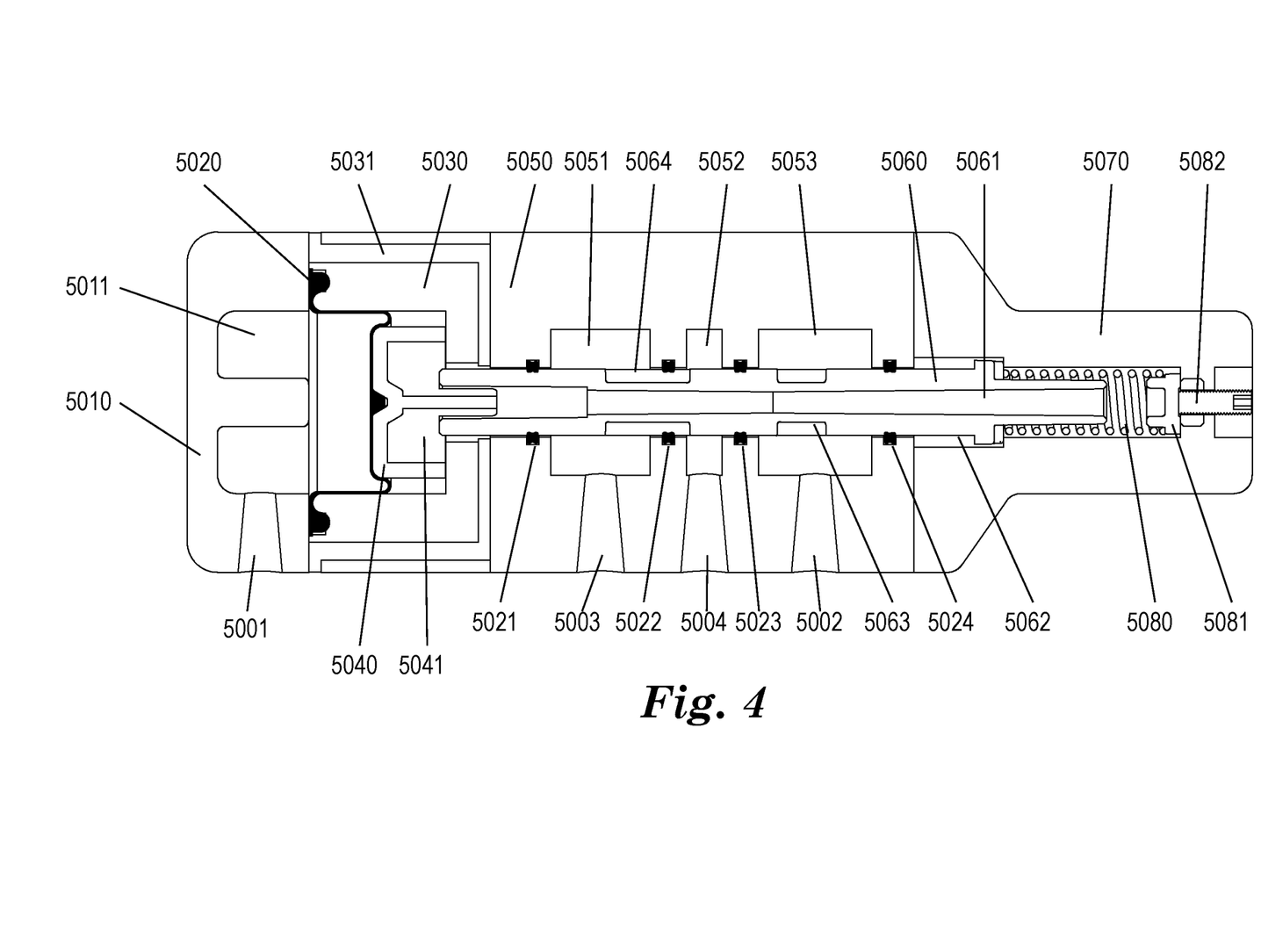
FIG. 4 is a schematic sectional view of main parts of the reversing valve 500 according to the embodiment of the present invention.

FIG. 2 is an exploded view of the reversing valve 500 according to the embodiment of the present invention. FIG. 3 is a schematic view of a portion obtained after half of the reversing valve according to the embodiment of the present invention is removed along an axis thereof. FIG. 4 is a schematic sectional view of main parts of the reversing valve 500 according to the embodiment of the present invention. As shown in FIG. 2, FIG. 3, and FIG. 4, the reversing valve 500 mainly includes portions such as a valve element 5060, a piston 5040, a piston diaphragm 5020, a compression spring 5080, a valve body 5050, a piston seat 5030, a diaphragm end cover 5010, and a spring housing 5070. The valve element 5060, the piston 5040, the valve body 5050, the piston seat 5030, the spring housing 5070, and the diaphragm end cover 5010 may be made of plastic, metal or other rigid materials having a certain rigidity. The piston diaphragm 5020 may be made of an elastic material having desirable sealing properties.

The valve body 5050, the piston seat 5030, the diaphragm end cover 5010, and the spring housing 5070 are fixed together in a certain connection mode, and the connection mode may be bolt and nut fasteners, threaded connections, or welding. Without being limited to the aforementioned manner, the piston seat 5030 and the valve body 5050 may be integrally formed, or the valve body 5050 and the spring housing 5070 may be integrally formed, or the piston seat 5030, the valve body 5050, and the spring housing 5070 may be integrally formed. At this time, the separate portions (including the aforementioned integrally formed portions) are also connected together by the aforementioned bolt and nut fasteners, threaded connections, or welding.

As shown in FIG. 4, the piston seat 5030 is provided with a hollow chamber therein used for carrying the piston 5040. The piston diaphragm 5020 is fixed to the diaphragm end cover 5010 and is disposed between the diaphragm end cover 5010 and the piston seat 5030 and disposed between the piston 5040 and the piston seat 5030, so that the piston 5040 has no direct contact with the piston seat 5030. Moreover, the diaphragm end cover 5010 and the piston diaphragm 5020 form one cavity 5011 in the diaphragm end cover 5010, the cavity 5011 communicates with the exterior of the reversing valve 500 through the channel 5001, and in the present invention, the cavity 5011 is connected to the connection point 5005 near the water inlet of the tap 600 in FIG. 1 through the channel 5001. On the other hand, as shown in FIG. 3 and FIG. 4, the piston diaphragm 5020 is tightly attached to end surfaces and a cylindrical side surface of the piston 5040 to ensure that the pressure in the cavity 5011 can be transferred to the surface of the piston 5040 through the piston diaphragm 5020. Because the piston 5040 and the piston seat 5030 are separated by the piston diaphragm 5020, there is no direct contact between the piston 5040 and the piston seat 5030 during relative movement of the piston 5040 and the piston seat 5030, and thus the frictional resistance is small and smooth and rapid displacement can be achieved.

Similarly, as shown in FIG. 4, the valve body 5050 is also provided with a hollow portion used for carrying the valve element 5060. In FIG. 4, the main body of the valve element 5060 has the shape of a cylinder or approximate cylinder, and the cylinder is preferably a hollow structure provided with a duct 5061 connecting two end surfaces of the valve element 5060. A contact and seal between the valve element 5060 and the valve body 5050 is achieved by four seal rings disposed at corresponding positions in the valve body 5050, and specifically, as shown in FIG. 3 and FIG. 4, a seal ring 5021, a seal ring 5022, a seal ring 5023, and a seal ring 5024 are respectively disposed in corresponding recesses inside the valve body 5050 in a direction from one side of the valve element 5060 close to the piston to one side of the valve element 5060 close to the spring. The seal rings 5021-5024 may be made of an elastic material having desirable sealing properties. The valve element 5060, the valve body 5050, the seal ring 5021, and the seal ring 5022 form one cavity 5051, the cavity 5051 communicates with the exterior of the reversing valve 500 through the channel 5003, and in the present invention, the cavity 5051 is connected to the node 2005 of the drainage component of the water purifier in FIG. 1 through the channel 5003. Further, the valve element 5060, the valve body 5050, the seal ring 5022, and the seal ring 5023 form another cavity 5052, the cavity 5052 communicates with the exterior of the reversing valve 500 through the channel 5004, and in the present invention, the cavity 5052 is connected to the cavity of the water storage tank 4002 of the water purifier in FIG. 1 through the channel 5004. Furthermore, the valve element 5060, the valve body 5050, the seal ring 5023, and the seal ring 5024 form another cavity 5053, the cavity 5053 communicates with the exterior of the reversing valve 500 through the channel 5002, and in the present invention, the cavity 5053 is connected to the concentrated water outlet (namely, the non-pure water outlet) 2002 of the reverse osmosis membrane filter element 200 of the water purifier in FIG. 1 through the channel 5002.

Figure 5:
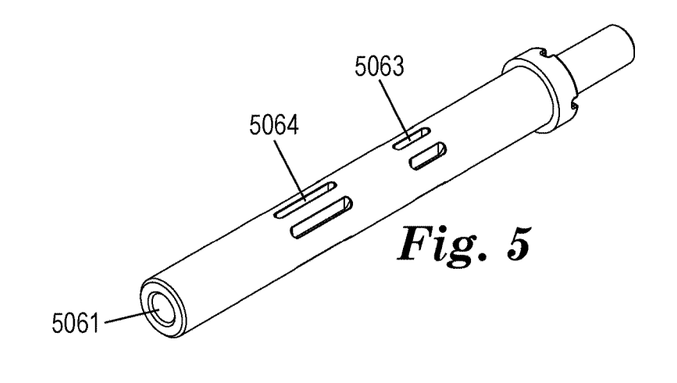
FIG. 5 is a schematic view of a core part, a valve element 5060, of the reversing valve 500 according to the embodiment of the present invention.

Still as shown in FIG. 4, two depressed portions 5064 and 5063 are disposed on the cylindrical surface of the main body of the valve element 5060. As shown in FIG. 5, each of the depressed portions 5064 and 5063 consists of a group of recesses distributed around an axis of the valve element 5060 on the surface of the valve element 5060. Those skilled in the art will understand that the details such as the geometrical shape, the length, the width, and the number of the recesses may be determined according to sizes of other constituent parts of the mechanical reversing valve 500 such as the valve body 5050 and the valve element 5060 and the specific application, and will not be described herein again. When one of the depressed portions 5064 and 5063 spatially overlaps one of the seal rings 5022 and 5023, cavities on two sides of the seal ring spatially overlapping the depressed portion can be connected; when the non-depressed cylindrical surface spatially overlaps one of the seal rings, cavities on two sides of the seal ring spatially overlapping the non-depressed portion are isolated and cannot be connected. Moreover, when the valve element 5060 is a hollow structure and is provided with a duct, namely, the central channel 5061 thereof, neither of the depressed portions 5064 and 5063 communicates with the duct of the valve element 5060. Further, it should be noted that according to the present invention, the depressed portions 5064 and 5063 are designed to spatially overlap the seal rings 5022 and 5023 only. More specifically, they are designed in such a manner that the depressed portion 5064 can spatially overlap the seal ring 5022 only, and when the depressed portion 5063 can spatially overlap the seal ring 5023 only. Moreover, when the depressed portion 5064 spatially overlaps the seal ring 5022, the depressed portion 5063 does not make contact with the seal ring 5022. The reverse is also true. In other words, the cavity 5051 communicates with the cavity 5052 or the cavity 5052 communicates with the cavity 5053, but the cavity 5051, the cavity 5052, and the cavity 5053 do not communicate with each other at the same time.

The piston 5040 is installed on one end surface of the valve element 5060. For example, the piston 5040 may be installed on the end surface of the valve element 5060 with an extended piston rod thereof in contact with the end surface. However, without being limited to this form, as shown in FIG. 4, in the case that the valve element 5060 is a hollow structure and is provided with the duct 5061, in order to prevent the piston 5040 from moving on the end surface of the valve element 5060, and in consideration of using the duct 5061 in the valve element 5060 for exhausting, a design that the piston rod of the piston 5040 extends into the duct 5061 of the valve element 5060 is adopted. In the embodiment shown in FIG. 4, the piston 5040 is installed on the left end surface of the valve element 5060, but those skilled in the art should understand that the embodiments of the present invention are not limited thereto.

Figure 9:
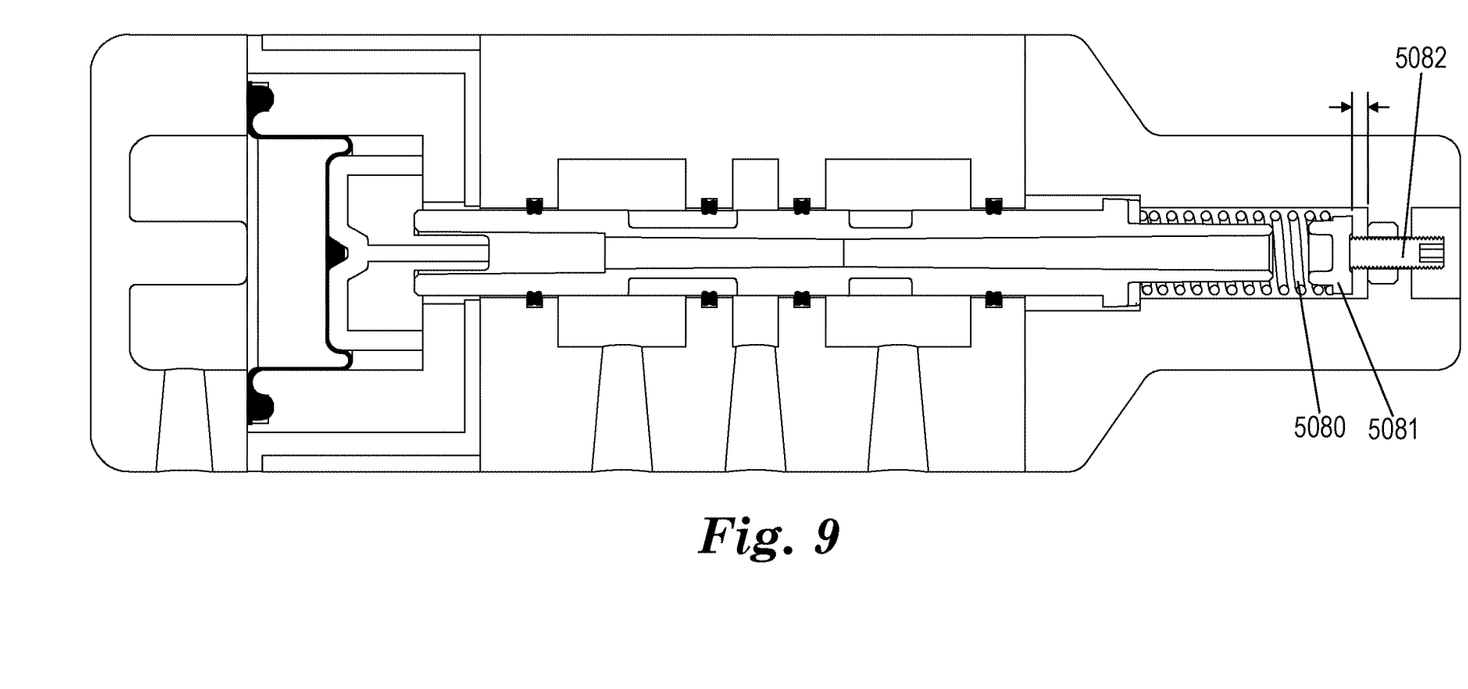
FIG. 9 is a schematic view illustrating spring pre-tensioning adjustment of the reversing valve 500 according to the embodiment of the present invention.

As shown in FIG. 4, the spring housing 5070 is also provided with a hollow chamber therein used for carrying the compression spring 5080. The other end surface (the right end surface shown in FIG. 4) of the valve element 5060 makes contact with one end of the compression spring 5080, the other end surface (the right end surface shown in FIG. 4) of the compression spring 5080 is restricted in position to a spring pre-tensioning adjusting bolt 5082 by a spring seat 5081, and the spring pre-tensioning adjusting bolt 5082 is installed on the spring housing 5070. Certainly, those skilled in the art should understand that the embodiments of the present invention are not limited thereto. For example, in another embodiment of the present invention, the spring seat 5081 may be omitted, and the other end surface of the compression spring is disposed to be connected to the spring pre-tensioning adjusting bolt 5082, and the spring pre-tensioning bolt 5082 is installed on the spring housing 5070. In still another embodiment of the present invention, further, the spring pre-tensioning bolt 5082 may be omitted, and the compression spring 5080 is directly installed on the spring housing. However, in consideration of fluctuations in an elastic coefficient of the spring 5080 during mass production of the reversing valve 500 or possible attenuation of the elastic coefficient of the spring 5060 during actual use, if a spring pre-tensioning force adjustment function is provided for the reversing valve 500, as shown in FIG. 9 (FIG. 9 is a schematic view illustrating spring pre-tensioning adjustment of the reversing valve 500 according to the embodiment of the present invention), that is, if the spring pre-tensioning bolt 5082 is provided, the position of the spring seat 5081 or the spring 5080 can be adjusted by turning the bolt 5082, so as to adjust a pre-tensioning force of the spring 5080 according to actual application requirements. Therefore, the spring pre-tensioning bolt 5082 is preferably provided in the reversing valve 500.

It should be noted that in the present invention, as shown in the above embodiment, the piston diaphragm 5020, the piston 5040, the valve element 5060, and the spring 5080 must be disposed to be coaxial. Moreover, the piston diaphragm 5020, the piston 5040, and the valve element 5060 are preferably axially symmetrical parts.

The operation of the reversing valve 500 is controlled by the pressure acting on the piston thereof through the channel 5001.

Figure 6:
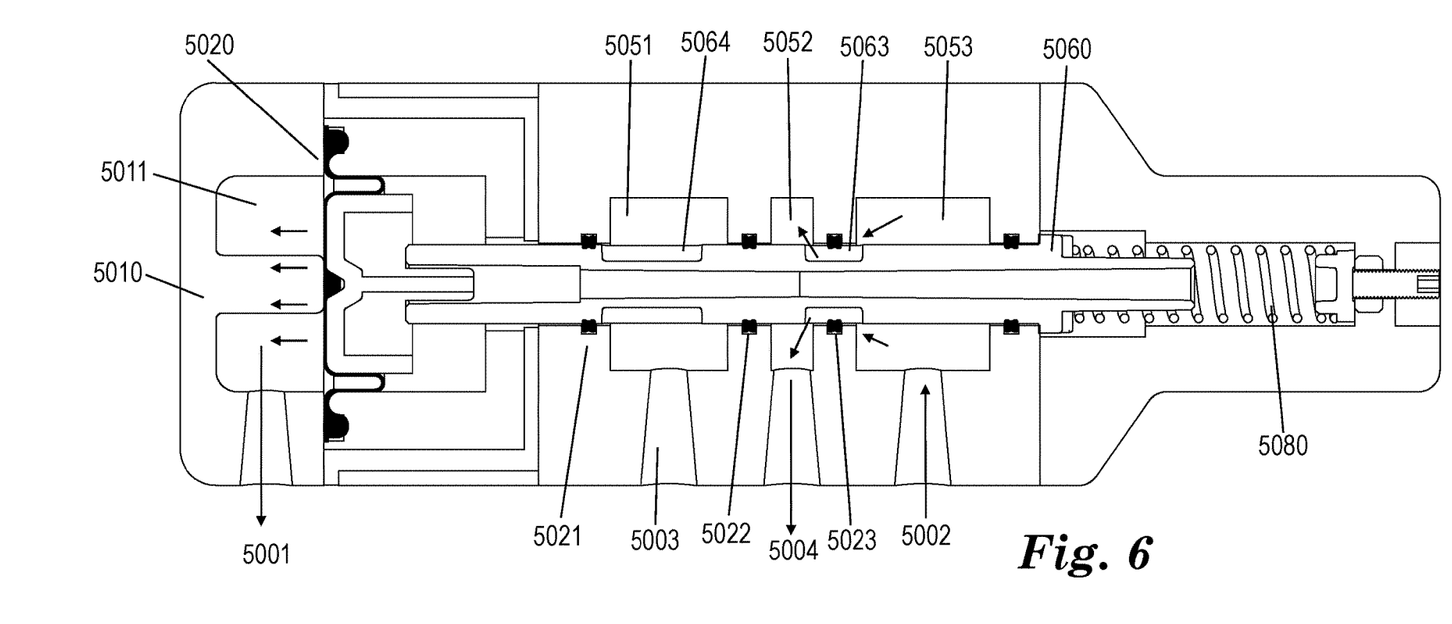

FIG. 6 is a schematic view illustrating a state of the reversing valve 500 according to the embodiment of the present invention when the tap 600 is turned on. As shown in FIG. 1 and FIG. 6, when the tap 600 is turned on, the waterway pressure of the channel 5001 attenuates, the water pressure acting on the piston diaphragm 5020 inside the reversing valve 500 drops, and the pressure on the piston side of the valve element 5060 is smaller than the pressure on the spring side, so the compression spring 5080 is stretched to push the valve element 5060 to move rapidly toward the piston side, during which since the valve element 5060 moves toward the piston side till it reaches at a predetermined position where the piston is stopped by the diaphragm end cover, as shown in FIG. 6, the seal ring 5023 spatially overlaps the depressed portion 5063 on the surface of the valve element 5060 and the cavity 5052 communicates with the cavity 5053; the depressed portion 5064 of the valve element is located between the seal rings 5021 and 5022, and thus the cavity 5051 is completely isolated and does not communicate with other cavities inside the valve body.

Because the cavity 5052 and the cavity 5053 are connected by the depressed portion 5063 on the surface of the valve element, the channel 5004 and the channel 5002 of the reversing valve 500 are connected; and because the cavity 5051 is completely isolated and does not communicate with other cavities inside the valve body, the connection between the channel 5004 and the channel 5003 of the reversing valve 500 is cut off. At this time, the pressure of the cavity 4001 in the water storage tank 400 is also released through the connection point 4003, the post-filter element 300, the one-way valve 301, and the tap 600, the water inlet 1031 of the automatic stop valve 103 communicates with the water outlet 1032, the pressure of tap water enters a pipeline of the water purifier through the water inlet of the pre-filter 100, passes through a filter element 101, the water outlet 1032 of the automatic stop valve 103, the water inlet 2001 of the reverse osmosis membrane filter element 200, the concentrated water outlet 2002, the connection point 2004, and the channel 5002 of the reversing valve 500, then is connected to the channel 5004 of the reversing valve 500, and finally enters the cavity 4002 of the water storage tank 400 and pushes pure water in the cavity 4001 to pass through the connection point 4003, the post-filter element 300, and the one-way valve 301, and finally flow out of the tap 600.

Figure 7:
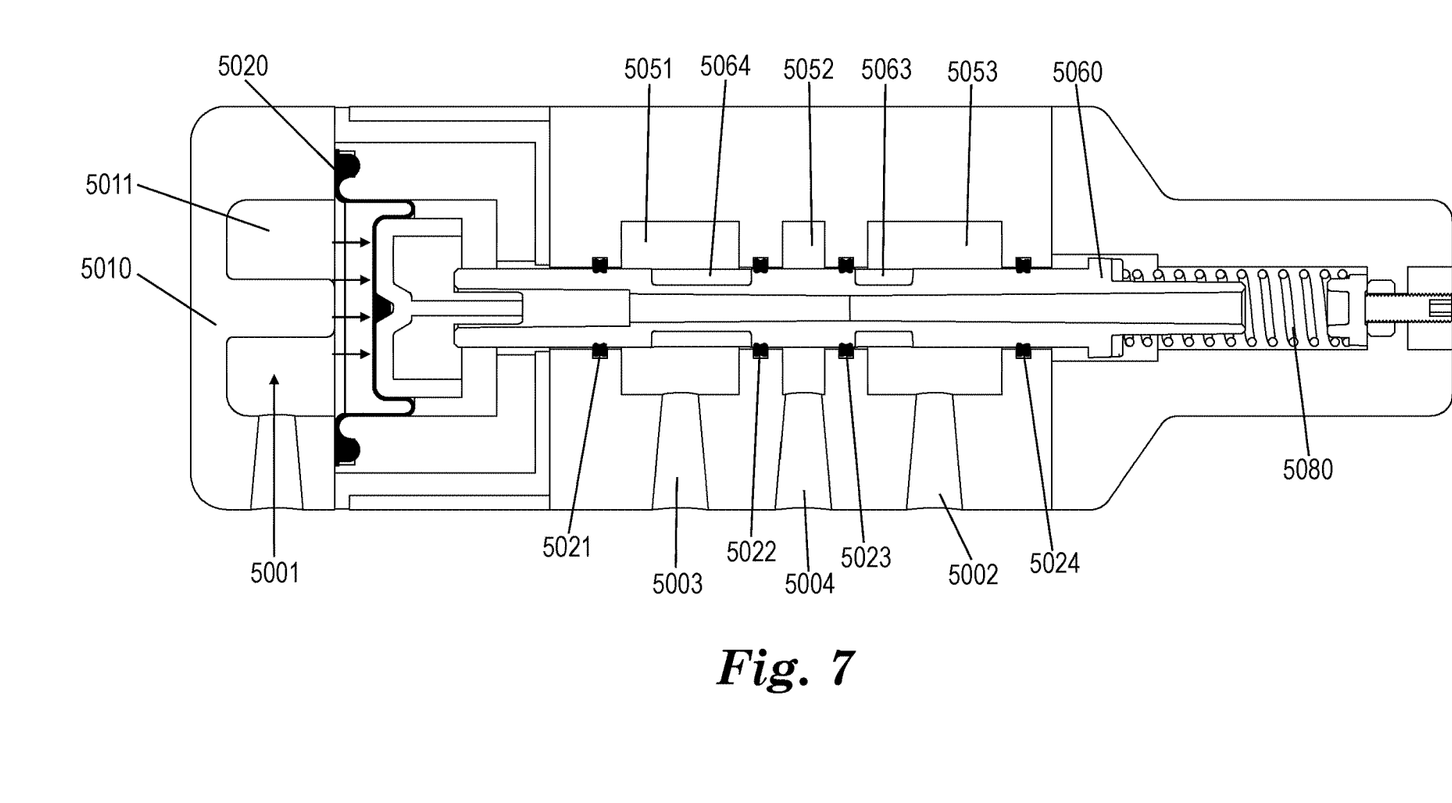
FIG. 7 is a schematic view illustrating an instantaneous state of the reversing valve 500 according to the embodiment of the present invention converted from a water intaking mode to water replenishing after the tap 600 is turned off.

As shown in FIG. 1, when the tap 600 is turned off, because the mechanical automatic stop valve 103 is in an open state at this time, the pressure of the tap water causes the pressure of the channel 5001 of the reversing valve 500 to rise rapidly in a short time. FIG. 7 is a schematic view illustrating an instantaneous state of the reversing valve 500 according to the embodiment of the present invention converted from a water intaking mode to water replenishing after the tap 600 is turned off. At this time, as shown in FIG. 7, because the water pressure in the cavity 5011 rises, the pressure on the piston side of the valve element 5060 increases, the spring 5080 is compressed, and the valve element moves rapidly toward the spring side. When the valve element 5060 moves to the position shown in FIG. 7, neither of the two depressed portions 5063 and 5064 spatially overlaps any seal ring; at this time, the cavities 5051, 5052, and 5053 inside the valve body do not communicate with each other, and therefore, the channels 5003, 5004, and 5002 do not communicate with each other.

When the reversing valve 500 is in the state shown in FIG. 7, because the mechanical automatic stop valve 103 is in the open state at this time and the pressure of the tap water still acts on the inside of the reverse osmosis membrane filter element 200 in the water purifier system in FIG. 1, pure water continues entering the cavity between the outlet 2003 of the reverse osmosis membrane filter element 200 and the water inlet 6001 of the tap through a reverse osmosis membrane. Because the channels 5003, 5004, and 5002 of the reversing valve 500 do not communicate with each other at this time, the cavity 4002 of the water storage tank 400 is in a state of being isolated from the outside, pure water newly entering the downstream of the reverse osmosis membrane filter element 200 causes the pressure of the cavity between the outlet 2003 and the water inlet 6001 of the tap to rise rapidly, the pressure of the channel 5001 of the reversing valve 500 also rises accordingly, and the valve element 5060 of the reversing valve 500 shown in FIG. 7 is pushed to continue moving toward the spring side.

Figure 8:
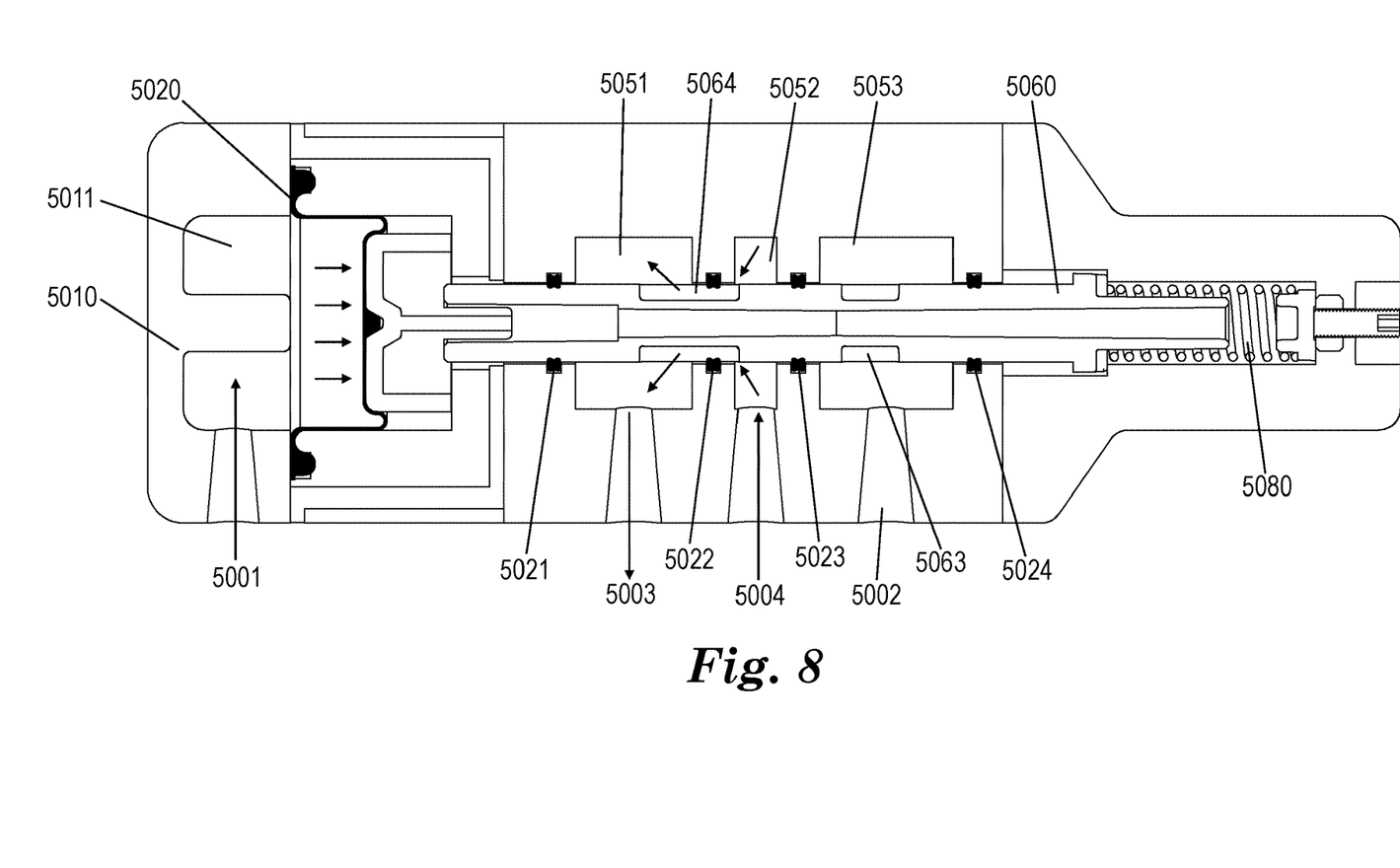
FIG. 8 is a schematic view illustrating a state of the reversing valve 500 according to the embodiment of the present invention when water is replenished and water is full after the tap 600 is turned off.

On the basis of the state in FIG. 7, as the valve element 5060 continues moving toward the spring side, since the valve element 5060 moves to a predetermined position toward the spring side till the valve element 5060 moves to a position at which the piston 5040 is restricted in movement by the piston seat 5030 (that is, stopped by the piston seat 5030), the seal ring 5022 spatially overlaps the depressed portion 5064 as shown in FIG. 8. At this time, the cavity 5051 communicates with the cavity 5052; the depressed portion 5063 of the valve element is located between the seal rings 5023 and 5024, and therefore, the cavity 5053 is completely isolated and does not communicate with other cavities inside the valve body.

Because the cavity 5051 communicates with the cavity 5052, the channel 5004 communicates with the channel 5003; as shown in FIG. 1, because the channel 5003 is connected to the drainage component, the pressure of the cavity 4002 of the water storage tank 400 is released in a short time, and meanwhile, the pressure in the pipeline on the cavity 4001 and the connection point 4003 is also released rapidly; at this time, the pressure in the pipeline between the water outlet of the one-way valve 301 and the tap 600 is maintained at a certain value due to the protection of the one-way valve 301, so as to maintain the valve element 5060 of the reversing valve 500 at a certain position through the channel 5001, and ensure that the channels 5004 and 5003 are connected and the connection between the channels 5004 and 5002 is cut off.

Afterwards, because the control waterway 1033 of the mechanical automatic stop valve 103 is connected to the connection point 4003 under a low pressure, the water inlet 1031 and 1032 of the stop valve are always connected, and the reverse osmosis membrane filter element 200 begins to produce pure water under the action of the pressure; the pure water gradually enters the pure water cavity 4001 of the water storage tank 400 through the water outlet 2003, the one-way valve 202, and the connection point 4003; original water in the cavity 4002 gradually drains through the channel 5004 and the channel 5003 under pressing of the cavity 4001; in the process that the pure water cavity 4001 of the water storage tank 400 gradually increases, the pressure in the pipeline of the connection point 4003 always has an extremely low value so as to ensure that the pressure of the tap water can fully act on the reverse osmosis membrane filter element 200, thereby ensuring enough pure water production flow.

When the pure water cavity 4001 of the water storage tank 400 is completely filled up and the cavity 4002 is completely drained, the pure water storage amount in the water storage tank 400 cannot be further increased, and driven by the pressure of the tap water, the pressure in the water storage tank 400 begins to gradually rise and the pressure in the pipeline of the connection point 4003 also begins to rise; when the pressure value is greater than the downstream pressure of the one-way valve 301, the ever rising pressure pushes the one-way valve 301 open and enters the channel 5001. As shown in FIG. 8, the pressure on the surface of the piston continues rising and pushes the valve element 5060 to continue moving toward the spring side till the piston is restricted in movement by the piston seat, and at this time, the valve element 5060 stops moving.

After the pressure in the water storage tank 400 rises to a certain value, the waterway 1033 drives the automatic stop valve to close the water inlet 1031 and the water outlet 1032, and the entire water purifier stops working.

Figure 10:
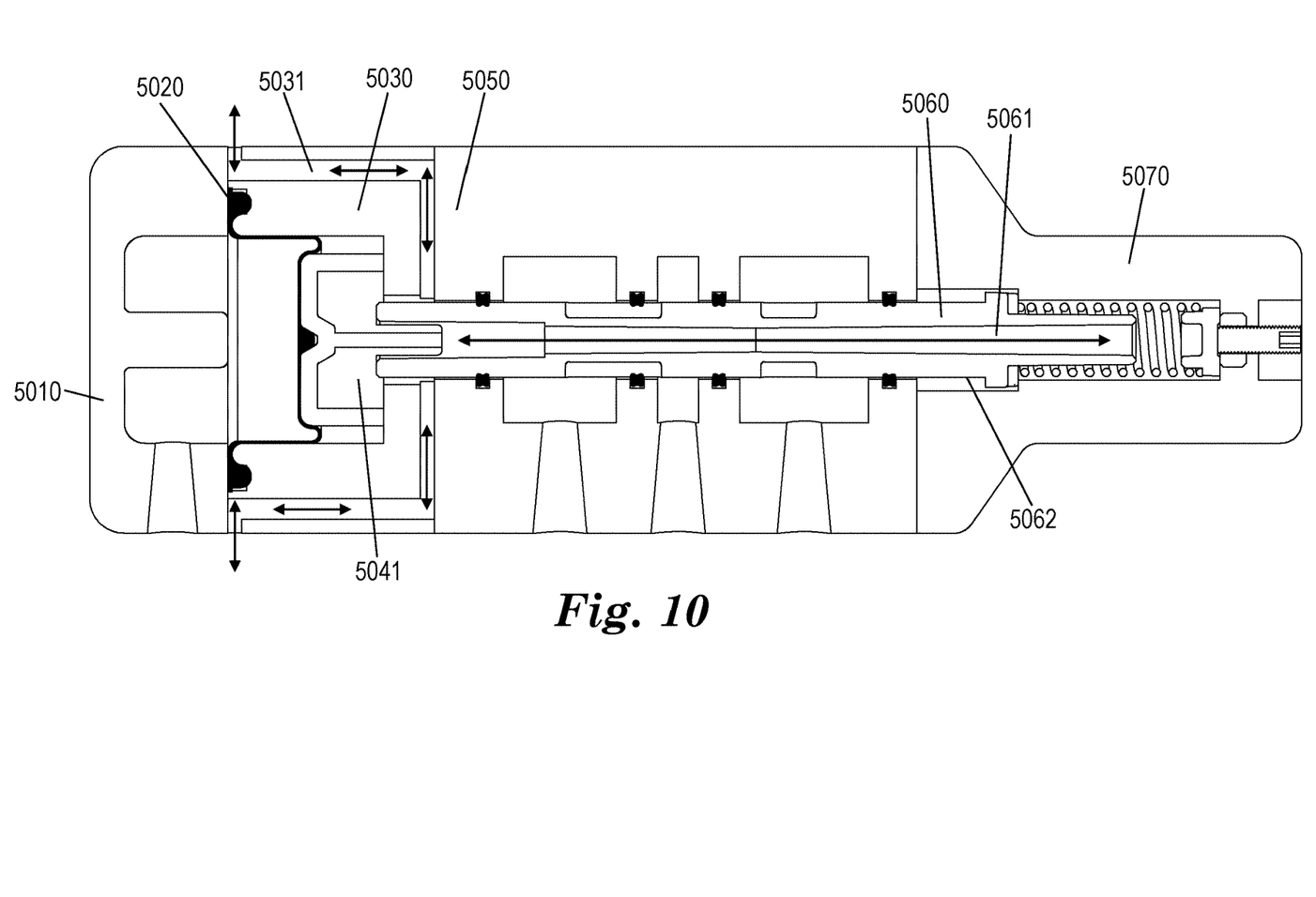
FIG. 10 is a schematic view illustrating exhausting of the reversing valve 500 according to the embodiment of the present invention during motion.

In addition, the problems of suction and exhausting caused by the change in volume of the cavity need to be considered during reciprocating motion of the reversing valve 500. FIG. 10 is a schematic view illustrating exhausting of the reversing valve 500 according to the embodiment of the present invention during motion. As shown in FIG. 10, two ends of the valve element 5060 of the reversing valve are separately provided with one cavity for solving the problems of suction and exhausting, and the cavities are respectively a cavity 5041 and a cavity 5062.

The cavity 5041 is located at the piston side of the valve element 5060 and is formed by the piston diaphragm 5020, the valve element 5060, and the piston seat 5030. When the valve element 5060 moves toward the piston side, the volume of the cavity 5041 increases; when the valve element 5060 moves toward the spring side, the volume of the cavity 5041 decreases.

The cavity 5062 is located at the spring side of the valve element 5060 and is formed by the valve body 5050, the valve element 5060, and the spring housing 5070. When the valve element 5060 moves toward the piston side, the volume of the cavity 5062 increases; when the valve element 5060 moves toward the spring side, the volume of the cavity 5062 decreases.

As shown in FIG. 10, the center of the valve element 5060 is provided with a duct (or called a channel) 5061 connecting the cavities 5041 and 5062, and when the valve element 5060 moves in a reciprocating manner, because the volumes of the cavities 5041 and 5062 on the two sides increase or decrease by an equal value, the central channel 5061 enables internal circulation of air of the two cavities without the need of adding flow channels of the two cavities for air outside the reversing valve 500.

However, in consideration of possible changes in air volume of the cavity caused by temperature changes, as shown in FIG. 10, the reversing valve 500 is provided with a ventilation channel 5031 between the internal cavity and the outside. The channel 5031 communicates with the cavity 5041 through a gap between the valve element 5060 and the piston seat 5030. Because the channel 5031 is provided with a bend, external foreign matters can be effectively prevented from entering the reversing valve 500 while ensuring free circulation of air, thereby avoiding a dysfunction caused by entry of foreign matters.

In the aforementioned novel water purifier, a mechanical automatic reversing valve is applied, original compressed air in a water storage tank is eliminated, there is no back pressure in production of pure water of the water purifier, and therefore, a booster pump and electric power are not required, and the fault rate and safety risk of the water purifier are greatly reduced.

When it is required to take water through a tap, the mechanical automatic reversing valve introduces the pressure of tap water into the water storage tank, pure water in the water storage tank is forced out through the pressure of the tap water, and the flow is always stable without the influence of air pressure attenuation of a conventional water storage tank or the influence of water temperature changes of a pure water machine without a water storage tank throughout the year.

It can be understood that the aforementioned embodiments are only exemplified embodiments adopted for describing the principle of the present invention; however, the present invention is not limited thereto. Those skilled in the art can make various transformations and improvements on the conditions of not departing from the spirit and essence of the present invention, and these transformations and improvements should be regarded as the protective scope of the present invention.

The invention claimed is:

1. A reversing valve, comprising:
a valve body, having a cylindrical or approximately cylindrical valve element disposed therein, wherein the valve element has a first end surface and a second end surface opposite to the first end surface;
a piston seat, disposed on the first end surface side of the valve element and having at least a portion in contact with the valve body, wherein an axially movable piston is disposed in the piston seat;
a diaphragm end cover, disposed on one side of the piston seat opposite to the valve body;
a piston diaphragm, fixed to the diaphragm end cover and disposed between the diaphragm end cover and the piston seat, and at least a portion of the piston diaphragm is also disposed between the piston and the piston seat, the piston and the piston seat being spaced apart by the diaphragm during axial movement of the piston so that the piston has no direct radial contact with the piston seat; and
a spring housing, disposed on the second end surface side of the valve element and having at least a portion in contact with the valve body, wherein a compression spring is disposed in the spring housing and the compression spring is disposed to be in contact with the second end surface of the valve element,
wherein the piston diaphragm, the piston, the valve element, and the compression spring are disposed to be coaxial and movable axially; and wherein
the piston diaphragm and the diaphragm end cover jointly form a first cavity in the diaphragm end cover, and the first cavity communicates with the exterior of the reversing valve through a first channel;
a first seal ring, a second seal ring, a third seal ring, and a fourth seal ring are sequentially disposed at different predetermined positions within the valve body in a direction from the first end surface to the second end surface; the valve body makes contact with the valve element by the first to fourth seal rings, and the valve body, the valve element, the first seal ring, and the second seal ring jointly form a second cavity in the valve body; the second cavity communicates with the exterior of the reversing valve through a second channel; the valve body, the valve element, the second seal ring, and the third seal ring jointly form a third cavity in the valve body; the third cavity communicates with the exterior of the reversing valve through a third channel; the valve body, the valve element, the third seal ring, and the fourth seal ring jointly form a fourth cavity in the valve body, and the fourth cavity communicates with the exterior of the reversing valve through a fourth channel;
a first depressed portion and a second depressed portion are sequentially disposed on a cylindrical surface of the valve element in the direction from the first end surface to the second end surface, wherein the second depressed portion is spaced apart from the first depressed portion by a predetermined distance in an axial direction of the cylindrical surface of the valve element when the valve element moves to a position where the first depressed portion spatially overlapping with the second seal ring, the second cavity communicates with the third cavity; and when the valve element moves to a position where the second depressed portion spatially overlapping with the third seal ring, the third cavity communicates with the fourth cavity.

2. The reversing valve according to claim 1, wherein the valve element is hollow and has a duct disposed therein and connects the first and second end surfaces thereof.

3. The reversing valve according to claim 2, wherein each of the first depressed portion and the second depressed portion consists of a group of recesses distributed around an axis of the valve element on the surface of the valve element and spaced apart from one another, and none of the recesses communicates with the duct of the valve element.

4. The reversing valve according to claim 2, wherein a portion of the piston extends into the duct of the valve element.

5. The reversing valve according to claim 2, wherein the reversing valve further comprises a piston-side cavity located between the piston and the piston seat, the piston-side cavity is formed jointly by the piston diaphragm, the valve element, and the piston seat, and the piston-side cavity communicates with the duct of the valve element, and when the valve element moves toward the diaphragm end cover, a volume of the piston-side cavity increases, and when the valve element moves toward the spring housing, the volume of the piston-side cavity decreases.

6. The reversing valve according to claim 5, wherein the reversing valve further comprises a spring-side cavity located between the spring housing and the valve body, the spring-side cavity is formed jointly by the valve body, the valve element, and the spring housing, and the spring-side cavity communicates with the duct of the valve element, and when the valve element moves toward the diaphragm end cover, a volume of the spring-side cavity increases, and when the valve element moves toward the spring housing, the volume of the spring-side cavity decreases.

7. The reversing valve according to claim 6, wherein when the valve element moves in a reciprocating manner in the valve body, the increased or decreased volume values of the piston-side cavity and the spring-side cavity are the same.

8. The reversing valve according to claim 6, wherein the reversing valve further comprises a ventilation channel located at the piston side and communicates with the exterior of the reversing valve, and the ventilation channel communicates with the piston-side cavity through a gap between the valve element and the piston seat.

9. The reversing valve according to claim 8, wherein the ventilation channel is bent.

10. The reversing valve according to claim 1, wherein the diaphragm end cover, the piston seat, the valve body, and the spring housing are fixed together by bolt and nut fasteners, threaded connections, or welding.

11. The reversing valve according to claim 1, wherein the piston seat, the valve body, and the spring housing are integrally formed, and the diaphragm end cover and the integrally formed portion are fixed together by bolt and nut fasteners, threaded connections, or welding.

12. The reversing valve according to claim 1, wherein the valve body and the piston seat are integrally formed, and the diaphragm end cover, the integrally formed portion, and the spring housing are fixed together by bolt and nut fasteners, threaded connections, or welding.

13. The reversing valve according to claim 1, wherein the valve body and the spring housing are integrally formed, and the diaphragm end cover, the piston seat, and the integrally formed portion are fixed together by bolt and nut fasteners, threaded connections, or welding.

14. The reversing valve according to claim 1, wherein when a pressure acting on the piston diaphragm through the first channel decreases, the valve element, being pushed by the compression spring, moves toward the piston side till it reaches a first predetermined position, and from this point till the valve element moves to a second predetermined position where the piston is stopped by the diaphragm end cover, the second depressed portion spatially overlaps the third seal ring so that the third cavity communicates with the fourth cavity, and the first depressed portion is located between the first seal ring and the second seal ring, and the first depressed portion does not spatially overlap with either of the first or second seal rings.

15. The reversing valve according to claim 1, wherein when a pressure acting on the piston diaphragm through the first channel increases so that the valve element moves toward the compression spring side and the amount of movement of the valve element is within a predetermined range, the first depressed portion is located between the first seal ring and the second seal ring, and the first depressed portion does not spatially overlap with either of the first or second seal rings, and the second depressed portion is located between the third seal ring and the fourth seal ring, and the second depressed portion does not spatially overlap with either of the third or fourth seal rings.

16. The reversing valve according to claim 15, wherein when the pressure acting on the piston diaphragm through the first channel continues increasing, the valve element continues to move toward the compression spring side till it reaches a third predetermined position, and from this point till the valve element continues to move to a fourth predetermined position where the piston is stopped by the piston seat, the first depressed portion spatially overlaps the second seal ring so that the second cavity communicates with the third cavity, and the second depressed portion is located between the third seal ring and the fourth seal ring, and the second depressed portion does not spatially overlap either of the third or fourth seal rings.

17. The reversing valve according to claim 1, wherein the first depressed portion is designed to spatially overlap the second seal ring only, the second depressed portion is designed to spatially overlap the third seal ring only, and the spatial overlap between the first depressed portion and the second seal ring does not coexist with the spatial overlap between the second depressed portion and the third seal ring.

18. A household water purifier, comprising:
a reverse osmosis membrane filter element, comprising a water inlet, a pure water outlet, and a non-pure water outlet, wherein the water inlet is used for receiving water to be treated;
a first one-way valve, having a water inlet communicating with the pure water outlet of the reverse osmosis membrane filter element through a waterway;
a second one-way valve, having a water inlet communicating with a water outlet of the first one-way valve through a waterway and having a water outlet communicating with a water inlet of a tap through a waterway;

a water storage tank, comprising a first cavity and a second cavity isolated and formed by a waterproof film, wherein total capacities of the two cavities are fixed, and the capacity of the first cavity decreases as the capacity of the second cavity increases or the capacity of the first cavity increases as the capacity of the second cavity decreases; the first cavity is used for accommodating pure water from the pure water outlet of the reverse osmosis membrane filter element and communicates with the water outlet of the first one-way valve and the water inlet of the second one-way valve through a waterway, and the second cavity is used for accommodating non-pure water from the non-pure water outlet of the reverse osmosis membrane filter element;

a switching device, used for connecting or disconnecting a waterway to the water inlet of the reverse osmosis membrane filter element according to a pressure change in the first cavity of the water storage tank; and the reversing valve according to claim 14, 15, 16, or 17, wherein the first channel of the reversing valve communicates with the water inlet of the tap through a waterway, the fourth channel of the reversing valve communicates with the non-pure water outlet of the reverse osmosis membrane filter element through a waterway, the second channel of the reversing valve communicates with a drainage path through a waterway, the third channel of the reversing valve communicates with the second cavity of the water storage tank through a waterway, the reversing valve is used for connecting the fourth channel to the third channel and meanwhile disconnecting the second channel from the third channel according to a change in water pressure acting on the piston through the first channel, or disconnecting the fourth channel from the third channel and meanwhile connecting the second channel to the third channel according to a change in water pressure acting on the piston through the first channel.

19. The household water purifier according to claim 18, wherein when the pressure of the first cavity of the water storage tank decreases to a first threshold, the switching device connects the waterway to the water inlet of the reverse osmosis membrane filter element, and when the pressure of the first cavity of the water storage tank increases to a second threshold, the switching device disconnects the waterway to the water inlet of the reverse osmosis membrane filter element, and the first threshold is less than the second threshold.

20. The household water purifier according to claim 18, wherein when the water pressure acting on the piston through the first channel decreases to a third threshold, the reversing valve connects the fourth channel to the third channel, and meanwhile disconnects the second channel from the third channel, and when the water pressure acting on the piston through the first channel increases to a fourth threshold, the reversing valve disconnects the fourth channel from the third channel and meanwhile connects the second channel to the third channel, and the third threshold is less than the fourth threshold.

* * * * *